Oct. 22, 1946.  J. W. McCUTCHEON  2,409,949
CAMERA FILM BOX
Filed Oct. 3, 1945  2 Sheets-Sheet 1
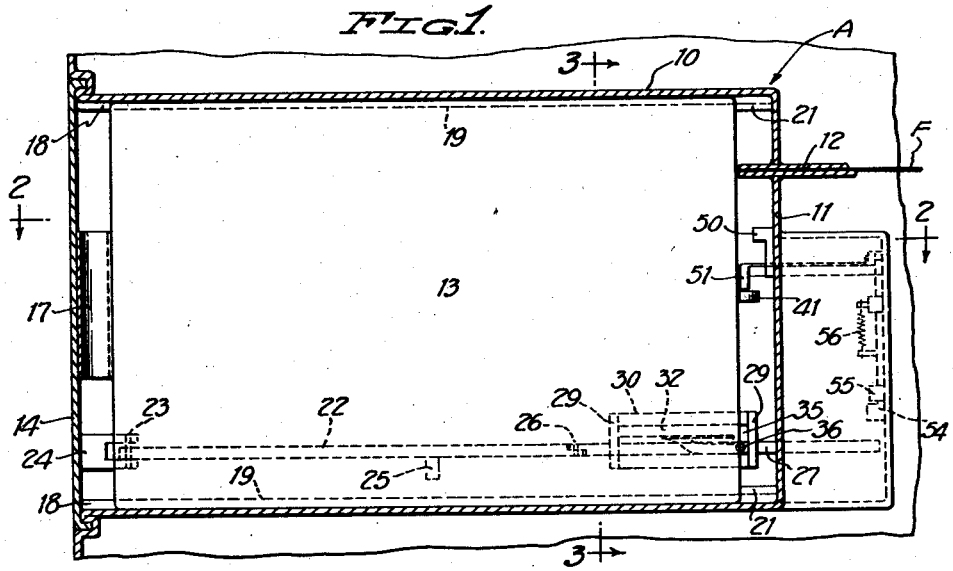
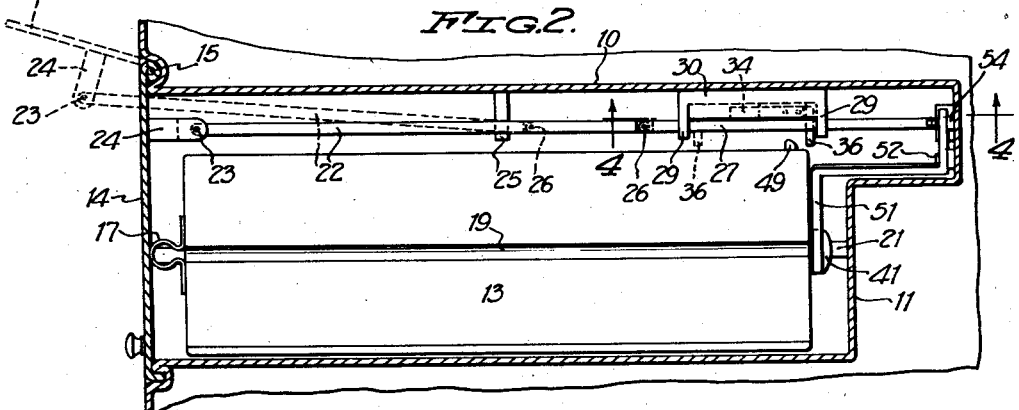
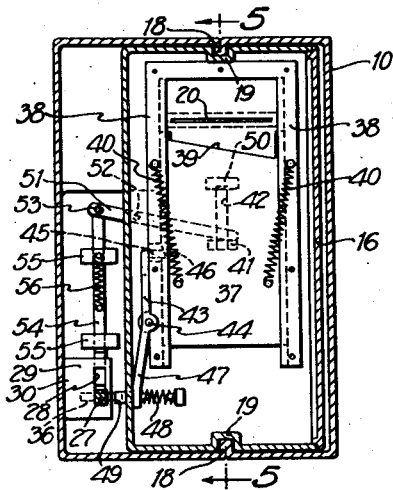
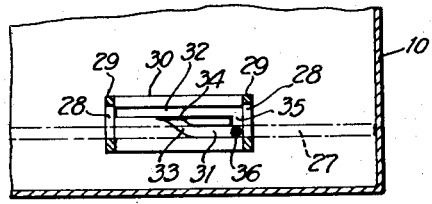
INVENTOR
JOHN W. McCUTCHEON
BY
ATTORNEYS INVENTOR
JOHN W. McCUTCHEON
BY
ATTORNEYS Patented Oct. 22, 1946

2,409,949

UNITED STATES PATENT OFFICE 2,409,949

CAMERA FILM BOX

John W. McCutcheon, Bronx 53, N. Y.

Application October 3, 1945, Serial No. 620,059

7 Claims. (Cl. 164—47)

This invention relates to improvements in camera film boxes.

One of the important features of the invention resides in a film box for association with a camera for receiving the exposed portions of the film to enable the development and printing of the exposed portions of a film while the unexposed portion remains in the camera.

Another feature of the invention is to provide an exposed light-proof film depository for cameras in which the exposed portion of the film may be severed by cutting from the unexposed portion of the film, and the depository separated from the camera without light entering the depository.

A further feature of the invention is to provide a camera film box which cannot be removed from its association with a camera unless the film strip is severed, thus preventing light from striking any portion of the exposed film.

Another feature of the invention is the provision of a light-proof camera box for exposed portions of camera film in which an empty box may be substituted for a filled box to facilitate rapid examination of pictures taken by the camera without encountering loading difficulties and uneconomical waste of unexposed film.

Other novel features of the invention will become apparent as the following specification is read in conjunction with the accompanying drawings, in which, Figure 1 is a vertical longitudinal sectional view through the camera film box in position of use.

Figure 2 is a horizontal sectional view taken substantially on the line 2—2 of Figure 1, the dotted lines indicating the position of the parts when the door is open and the film box is about to be removed from its cabinet.

Figure 3 is a vertical transverse sectional view on the line 3—3 of Figure 1.

Figure 4 is a detail vertical sectional view on the line 4—4 of Figure 2.

Figure 5:
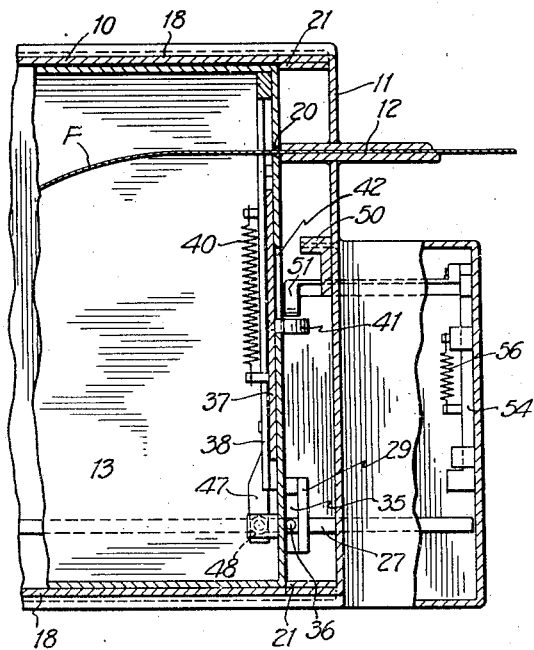
Figure 5 is an enlarged vertical sectional view on the line 5—5 of Figure 3.
Figure 6:
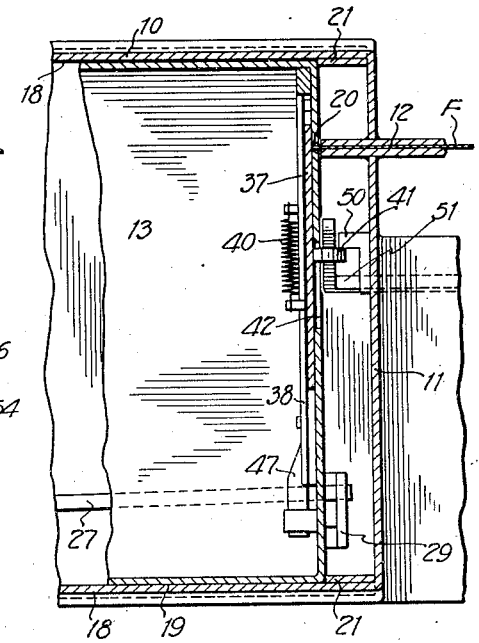
Figure 6 is a view similar to Figure 5 with the cutter member in released position.

The camera film box in its entirety is designated A and whereas it is adaptable for use with various camera apparatus, the same is shown in my copending application, Serial No. 620,058, filed Oct. 3, 1945, relating to an apparatus for automatically photographically recording the picture of a vehicle and its speed of travel over a highway. In that instance, the box A receives the exposed film as it is fed from the camera which forms a part of the recording apparatus.

In the drawings, 10 designates a substantially rectangular casing or cabinet which may be part of a camera apparatus (not shown). The rear wall 11 of the casing is disposed adjacent the film exit of the camera and has a horizontally disposed film slit 12 therein adjacent the top thereof through which the exposed portion of the film F passes for subsequent entry into a removable depositary in the form of a box 13. The box 13 is insertable into the casing 10 through the open front thereof, which open front is normally closed by a hinged door 14 which swings on a vertical pivotal axis 15.

The box 13 is rectangular in cross section and is of a height to freely slide in and out of the casing. The box 13 is of a width less than the width of the casing and is disposed close to that side of the casing opposite to which the door is hinged so as to provide a space between the box and the adjacent wall of the casing to accommodate certain mechanism presently to be described. That side of the box 13 nearest the side wall of the casing is provided with a removable cover 16 for the box is lightproof. The front end of the box 13 is provided with a handle 17 to enable the convenient sliding of the box into and out of the casing 10. The box is guided during its sliding movement by inwardly extending ribs 18 on the top and bottom of the casing which enter longitudinal grooves 19 provided in the top and bottom walls of the box.

The inner end wall of the box 13 is provided with a horizontal slit-like opening 20 which registers with the film slit 12 and through which the film F passes during its entry into the box. The walls of the opening 20 are bevelled outwardly for guiding the film in its passage therethrough. The box 13 is limited in its inward sliding movement by stops 21 on the casing 10 with which it engages. The handle 17 extends a predetermined distance from the front end of the box 13 so that when the door 14 is closed the box is firmly in engagement with the stops 21. Suitable catch means may be provided for securing the door 14 in closed position.

An actuating rod section 22 has its outer end pivotally connected at 23 to an arm 24 extending from the inner side of the door adjacent the hinge 15, while the inner end thereof is slidably supported upon a lug 25 extending inwardly from the adjacent wall of the casing 10. Pivotally connected to the inner end of the rod section 22 at 26 on a vertical pivotal axis is an inner rod section 27 which slidably extends through alined slots 28 provided in inwardly extending ears 29 formed integral with a flat member 30 secured to the adjacent side wall of the casing. The slots 28 are of a width to permit sliding movement of the rod section 27 without lateral movement and are of a height greater than that of the rod section to permit of a limited up and down movement for a reason to be hereinafter explained. When the door 14 is closed, the free end of the rod section 27 is disposed adjacent the read end of the casing 10 as best illustrated in Figures 1 and 5.

The inner rod section 27 is movable from a lower level to a higher level upon opening of the door 14, and thence from the higher level back to the lower level upon closing of the door. This function is obtained by providing a lower groove 31 and an upper groove 32 in the exposed face of the member 30. The front end of the groove 31 is connected to an intermediate portion of the groove 32 by an upwardly inclined groove 33 normally closed at its top by a flap spring 34. The rear ends of the grooves 31 and 32 are connected by a passage 35. Movable through the grooves 31, 32, 33 and passage 34 during each cycle of opening and closing the door 14 is one end of a cross pin 36 which extends transversely through the rod section 27 and is fixed thereto. When the door 14 is opened, the rod section 27 will move forward causing the pin 36 to move forward on a horizontal plane until it reaches the inclined groove 33 where it is cammed upwardly and forwardly and forcibly lifts the flap 34 up and while still moving forward the pin enters the upper groove 33 and moves to the front end thereof. The flap 34 has closed under its spring tension and upon closing of the door 14 the rod section 27 will slide rearwardly causing the pin 36 to move rearwardly in the upper groove 33 until it reaches passage 35 where it drops by the level of the groove 31 along with the rod section 27, thus the rod section like the pin 36 moves from a low to a higher level when the door is opened and subsequently returns to the low level when the door is closed.

Slidably mounted for vertical movement against the inside of the rear end wall of the box 13 is a guillotine knife 37, the same being guided by vertical guide strips 38—38 secured to the inner side of the rear end wall. The upper cutting edge 39 of the knife is cut at an inclined angle from one side edge to the other and the knife is normally disposed in its lower position with the cutting edge 39 disposed beneath the film receiving opening 20. Contractile springs 40—40 have one of their ends fixed to the guide strips 38—38 while the other ends are secured under tension to the knife 37. A lug 41 extends from the knife through a vertically elongated slot 42 in the rear end wall of the box. The lug 41 is engageable with the ends of the slot 42 for limiting the up and down sliding movements of the knife.

The inclined cutting edge 39 of the knife imparts a progressive cutting of the film F from one edge to the other during a cutting operation, and when the knife is in raised position, the same covers the slot 20 to prevent the passage of light into box 13 when the box is withdrawn from the casing 10.

Figure 7:
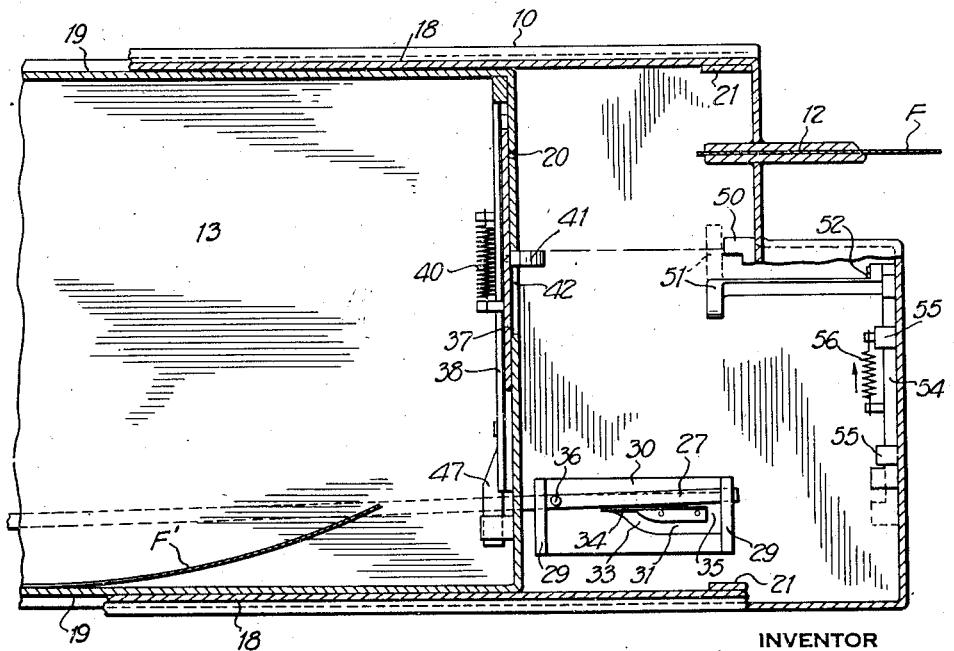
Figure 7 is a view similar to Figure 5 showing the film box in a partially withdrawn position.

The knife 39 is set for cutting operation by releasable catch means which holds the knife in a down position under the tension of the springs 40—40. The releasable catch means includes a catch member 43 pivoted to an adjacent strip 40 as at 44. The upper end of the catch member has a bill 45 extending through a slot in the strip 40 and which engages in a notch 46 in the adjacent side edge of the knife. The tail end 47 of the catch member is pressed against the adjacent wall of the box by a spring 48, said tail end having an outwardly extending finger 49 passing through a light screened opening in the side wall of the box. The finger 49 has a bevelled surface disposed in confronting relation to the pin 36 when the pin is in its lowered rear position as shown in Figure 3. Thus as the pin 36 moves forward upon opening of the door 14, the pin will force the finger 49 inwardly causing the bill 45 of the catch member to disengage the notch 46 and allowing the knife 37 to slide upwardly under the influence of the springs 40—40, thereby severing the film F at its entrance to the box 13. In Figure 7, a portion F' of an exposed film is shown within the box 13, the same having been cut from the film F beyond the opening 20.

When the box 13 is being slid into position within the casing, and the knife is in the release position, the inward movement thereof is limited by a stop 50 carried by the end wall of the casing. The stop 50 limits the upward movement of the knife just prior to the complete upward movement thereof so that in the event that the box is drawn slightly forward, the knife will rise its remaining distance of travel at which time the lug 41 and stop 50 are on the same plane and the box is prevented from being returned to its fully inserted position within the casing, thereby preventing the door 14 from being closed. Thus, a warning is given to an operator that the knife has not been set to its lower latched position, or if set, the same has been accidentally released.

Means is also provided for preventing the insertion of the box 13 into operative position within the casing should the operator fail to set the knife 37. Such means includes a rock lever 51 pivoted to the rear wall of the casing as at 52. One end of the rock lever 51 is free and is disposed in the path of upward movement of the lug 41 so as to be actuated thereby when the knife 37 slides upward during a cutting operation. The other end of the rock lever 51 is pivoted at 53 to the upper end of a bar 54 slidably mounted in bearings 55 carried by the casing. A contractile spring 56 acts to normally urge the bar upwardly and the free end of the rock lever 51 downwardly. When the knife 37 is released and moves upwardly, the lug 41 engages and lifts the free end of the rock lever 51 causing the bar 54 to slide down against the action of the spring 56 whereupon the lower end of the rod will be disposed in the path of inward movement of the rod section 27 and prevent the door 14 from being closed, although the box may be fully inserted into the casing 10.

From the foregoing, it will be understood that should an operator slide in a box 13 with the knife 37 set, then accidentally release the knife by opening the door 14, he will be warned of such release by the fact that the door will not again close. Boxes may be made interchangeable with all camera machines to facilitate rapid exchange of empty boxes for filled boxes. Thus a rapid examination of the pictures taken by a camera equipped with this invention may be made without encountering loading difficulties and uneconomical waste of film.

While I have shown and described what I consider to be the preferred embodiment of my invention, I wish it to be understood that such changes in construction and design as come within the scope of the appended claims may be resorted to if desired without departing from the spirit of my invention.

Having thus described my invention, what I claim as new and desire to secure by Letters Patent is:

1. A strip depository comprising a casing open at its front having a strip inlet in its rear wall, a hinged door at the open front of said casing, a strip receiving box slidable into and out of said casing, said box having a strip inlet in registration with the strip inlet in said casing, knife means within said box for cutting a strip of material at the strip inlet thereof, catch means acting to hold the knife means in a set position for operation, and means operable upon the initial opening movement of the door for releasing the catch means to enable functioning of the knife means.

2. A strip depository comprising a casing open at its front having a rear wall provided with a strip inlet, a hinged door closing the open front of the casing, a strip receiving box slidable into and out of the casing through the open front thereof, said strip receiving box having a rear wall provided with a strip aperture in registration with the strip inlet, a vertically reciprocable knife mounted on the inner side of the rear wall of the box and movable past the strip aperture, spring means acting to normally slide the knife past the strip aperture, catch means for holding the knife in a set position clear of the strip aperture against the action of the spring means, and means operable by the initial opening movement of the door for releasing the catch means to enable the spring means to slide the knife to cutting position past the strip aperture.

3. A strip depository as set forth in claim 2 including stop means for preventing the full insertion of the strip receiving box into the casing when the knife is in released position.

4. A strip depository as set forth in claim 2 including means operable upon the movement of the knife to cutting position for preventing the full closing of the door.

5. A strip depository comprising in combination a rectangular casing open at its front having a rear wall provided with a strip inlet for receiving the portion of a strip, a strip receiving box slidable into and out of the casing through the open end thereof, a hinged door for normally closing the open front of the casing, said casing having a rear wall provided with a strip aperture in registration with the strip inlet, a knife slidably mounted on the rear wall of the box on the inner side thereof, spring means acting to move the knife past the strip aperture, releasable catch means for holding the knife in a retracted set position against the action of the spring means, and means operable upon swinging movement of the door to open position for releasing the catch means to enable the spring means to slide the knife to cutting position past the strip aperture and in tight sealing engagement therewith.

6. A strip depository as set forth in claim 5 in which the means operable, upon swinging movement of the door to open position, includes a pin, which is forwardly slidable in the path of movement of the catch means upon opening of the door and rearwardly slidable out of the path of movement of the catch means upon closing of the door.

7. A strip depository comprising a casing open at its front having a strip inlet in its rear wall, a hinged door at the open front of said casing, a light-proof strip receiving box slidable into and out of said casing, said light-proof box having a strip inlet in registration with the strip inlet in said casing, knife means within said box for cutting a strip of material at the strip inlet thereof, catch means acting to hold the knife means in a set position for operation, and means operable upon the initial opening movement of the door for releasing the catch means to enable functioning of the knife means.

JOHN W. McCUTCHEON.